United States Patent [19]

Sarraf

[11] Patent Number: 4,995,689
[45] Date of Patent: Feb. 26, 1991

[54] WAVEGUIDE SCANNER

[75] Inventor: Sanwal P. Sarraf, Webster, N.Y.

[73] Assignee: Eastman Kodak Company, Rochester, N.Y.

[21] Appl. No.: 390,956

[22] Filed: Aug. 9, 1989

[51] Int. Cl.$^5$ ............................ G02B 6/10; G02F 1/29
[52] U.S. Cl. ................................. 350/96.14; 350/96.13
[58] Field of Search .............. 350/96.12, 96.13, 96.14, 350/355; 372/24

[56] References Cited

U.S. PATENT DOCUMENTS

| | | | |
|---|---|---|---|
| 3,924,931 | 12/1975 | Chee ................................ | 350/160 R |
| 3,958,862 | 5/1976 | Scibor-Rylski ................... | 350/160 R |
| 4,389,659 | 6/1983 | Sprague ............................ | 346/153.1 |
| 4,755,036 | 7/1988 | Suzuki et al. .................... | 350/96.13 |
| 4,758,062 | 7/1988 | Sunagawa et al. ............... | 350/96.14 |
| 4,770,483 | 9/1988 | Ridgway ........................... | 350/96.13 |

Primary Examiner—John D. Lee
Assistant Examiner—John Ngo
Attorney, Agent, or Firm—Donald D. Schaper

[57] ABSTRACT

A scanner is disclosed which uses an electro-optic deflector to deflect a light beam onto a receiving medium. The deflector comprises a substrate formed of an optical material and a thin film optical channel waveguide fabricated on a top surface thereof. A light beam is supplied to the waveguide along an optical axis in the waveguide. An array of parallel metallic electrodes are formed adjacent to the waveguide. Each of the electrodes is adapted to receive a voltage independently of the other electrodes. When a voltage is supplied to an electrode, a local variation in the index of refraction of the waveguide occurs across the thickness of the waveguide, and this local variation is used to effect the radiation of the beam into the substrate. In order to use the waveguide to scan a light beam across the receiving medium, the light beam is supplied to the waveguide in a direction normal to the electrodes, and a voltage is sequentially supplied to the electrodes.

13 Claims, 3 Drawing Sheets

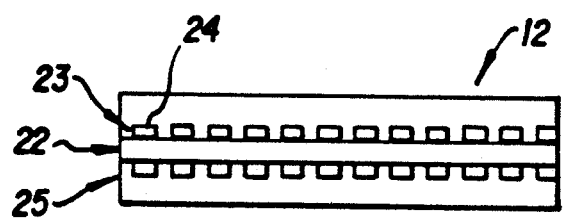
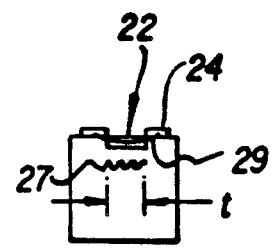
FIG. 2
FIG. 4
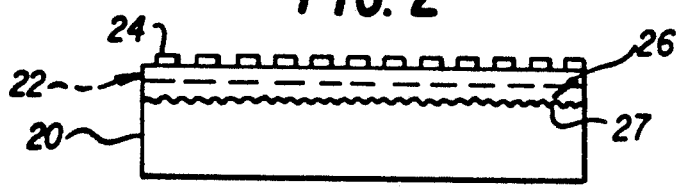
FIG. 3
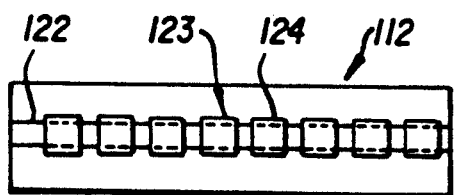
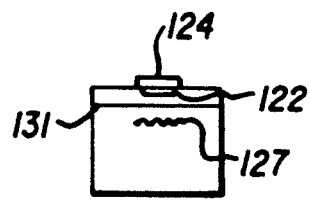
FIG. 6
FIG. 8
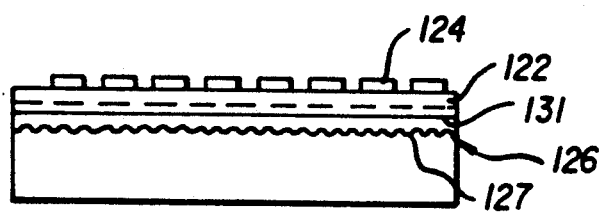
FIG. 7

WAVEGUIDE SCANNER

CROSS REFERENCE TO RELATED APPLICATION

Reference is made to U.S. patent application, Ser. No. 391,270, are now pending, entitled "Scanner", filed in the name of Sarraf et al. on even date herewith; this application is assigned to the assignee of the present application.

BACKGROUND OF THE INVENTION

1. Field of the Invention

This application relates to a scanner, and more particularly, to solid-state waveguide scanner.

2. State of the Prior Art

Various printing systems are known in which a modulated light beam is scanned across a receiving medium. Mechanical deflection devices, such as polygon scanners or galvanometers, can be used to direct the light beam onto the receiving medium. Although these devices are generally satisfactory for many applications, there is a need in the art to increase the speed of operation of the devices and to achieve greater pixel density. In response to these needs, solid-state deflection devices have been developed. Such devices include devices using LED's to expose a recording medium and devices using electro-optic elements which have a plurality of individually addressable electrodes for controlling the passage of light.

In the patent to Sprague, U.S. Pat. No. 4,389,659, there is shown a scan printer which includes a multi-gate light valve comprising an electro-optic element, and a plurality of separately addressable electrodes coupled to the electro-optic element. A sheet-like collimated beam is transmitted through the electro-optic element, and an information signal is selectively applied to the electrodes to control the light which is transmitted to a receiving medium. A problem with this printer is that the output power of the light source is effectively divided among the many pictures elements required to define a line of the image. If the data samples are short-lived, there may be insufficient energy available at one or more picture element positions to adequately expose the receiving medium. Thus, complex circuitry is necessary to maintain the data samples for each line of the image on the electrodes for a period of time sufficient to expose the recording medium.

SUMMARY OF THE INVENTION

It is an object of the present invention to overcome the problems in the prior art discussed above and to provide a solid-state scanner having improved performance.

In accordance with one aspect of the present invention, there is provided a scanner comprising: a substrate formed of an optical material; a thin film optical channel waveguide formed on the substrate; a plurality of electrodes formed adjacent to the waveguide, the electrodes extending in a first direction and being generally parallel to each other; means for regulating a voltage on the electrodes to electro-optically induce a local change in the refractive index of the waveguide across the thickness thereof; means for coupling a coherent light beam into the waveguide in a second direction transverse to the first direction, the beam propagating in the second direction and being radiated into the substrate under the waveguide upon encountering the refractive index change; and means for coupling the beam out of the waveguide.

In one embodiment of the invention, the scanner includes an electro-optic waveguide which comprises an electrically conductive substrate having a thin film optical channel waveguide fabricated on a top surface thereof. One linear array of thin metallic electrodes are formed on the substrate along one side of the channel waveguide, and a second array of thin metallic electrodes are formed along an opposite side of the waveguide. The electrodes are equally spaced and are parallel to each other. Each of the electrodes along one side is adapted to receive a voltage independently of the other electrodes. A laser beam is coupled in the waveguide such that the beam propagates in a direction normal to the electrodes.

When a voltage is applied to a selected electrode, a potential difference is produced between the electrode and an opposite electrode located across the channel waveguide. This potential difference generates a fringing field, oriented perpendicular to the plane of the waveguide, which electro-optically induces a local variation in the index of refraction of the waveguide across the thickness of the waveguide. This variation in the index of refraction changes the mode profile of the incoming laser, and the laser beam is radiated into the substrate. The beam is coupled away from the waveguide by means of a Bragg-matched grating, and the beam is imaged onto a receiving medium by optical elements.

An advantage of the scanner of the present invention over mechanical deflection systems is that the scanner is much more reliable and compact than such systems. The disclosed scanner has the advantage over solid-state devices, such as LED arrays, of having a much simpler microelectric structure. Further, the scanner of the present invention solves the problem of insufficient light output which exists in known waveguide scanners of to total internal reflection type. The disclosed scanner can be used both as an input scanner and an output scanner.

Other features and advantages will become apparent with reference to the following Description of the Preferred Embodiment when read in light of the attached drawings.

BRIEF DESCRIPTION OF THE DRAWINGS

FIG. 2 is a top plan view of the deflector in the scanner shown in FIG. 1;

FIG. 3 is a front elevational view of the deflector shown in FIG. 2;

FIG. 4 is an end elevational view of the deflector shown in FIG. 2;

FIG. 6 is a top plan view of the embodiment of the invention shown in FIG. 5;

FIG. 7 is a front elevational view of the embodiment shown in FIG. 5; and

FIG. 8 is an end elevational view of the embodiment shown in FIG. 5.

DESCRIPTION OF A PREFERRED EMBODIMENT

Figure 1:
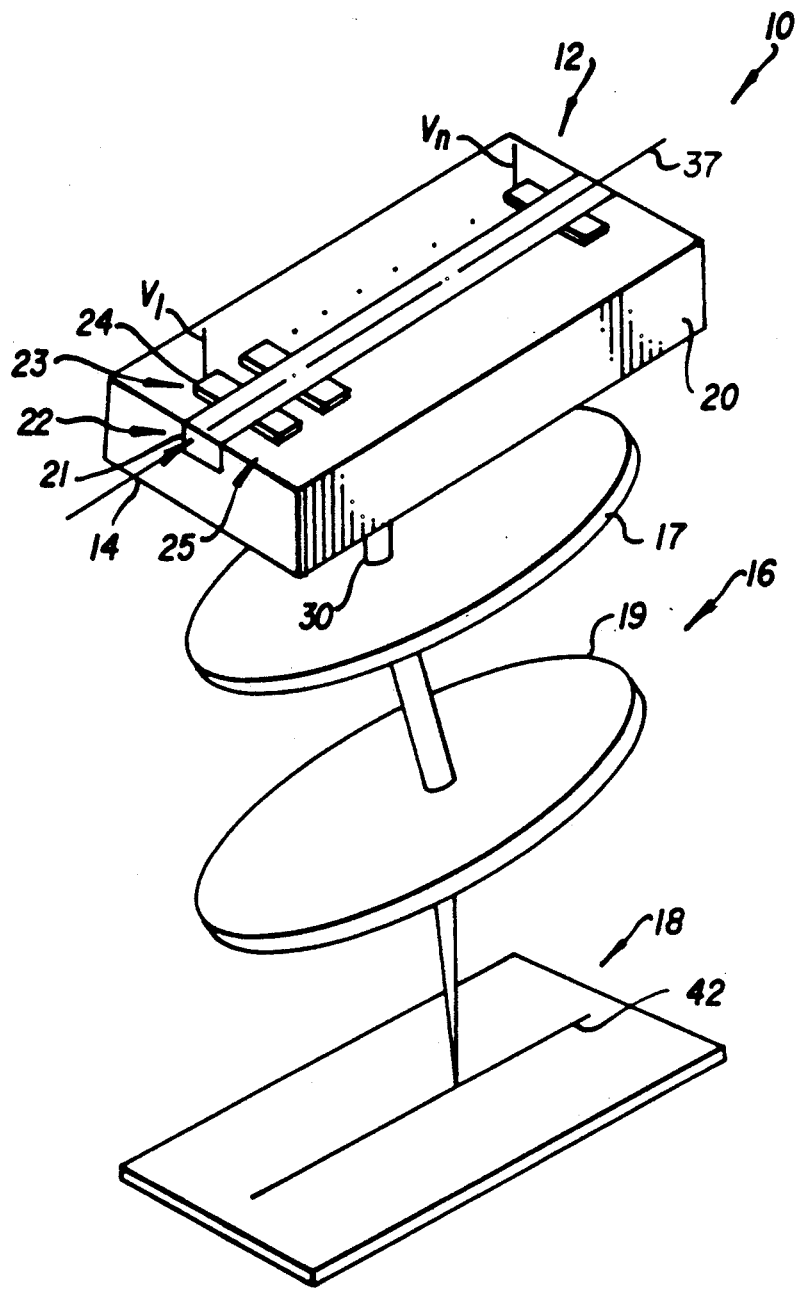
FIG. 1 is a perspective view of the scanner of the present invention.

With reference to FIG. 1, there is shown an input scanner 10 constructed in accordance with the present invention. Scanner 10 comprises an electro-optic deflector 12, an input light source 14 indicated schematically in FIG. 1, imaging optics 16, and a receiving medium 18 which can be, for example, a photosensitive medium.

Deflector 12 comprises a substrate 20 which can be formed from an optical material such as glass, sapphire, or quartz. A thin film optical channel waveguide 22 is formed in a channel 21 on substrate 20. Waveguide 22 can be, for example, a semiconductor thin film grown on the substrate 20 by liquid phase, or vapor phase, epitaxy. Waveguide 22 can also be an electro-optic thin film material such as LiNbO$_3$, BaTiO$_3$, or an organic material of a high electro-optic coefficient. One suitable method of forming waveguide 22 is disclosed in an article entitled "Electro-optic cutoff modulator using a Ti-indiffused LiNbO$_3$ channel waveguide with asymmetric strip electrodes," *Optics Letters*, Vol. 11, No. 12, December 1986.

With reference to FIG. 1, one linear array 23 of metallic electrodes 24 are formed on one side of waveguide 22, and a second linear array 25 of electrodes 24 are formed on an opposite side of the waveguide 22. As shown in FIGS. 1 and 2, the electrodes 24 are parallel to each other and are spaced from each other by an equal amount. The electrodes 24 are disposed at a right angle to an optical axis 37 of a beam from light source 14.

Each of the electrodes 24 is connected to a voltage supply, indicated by $V_1$-$V_n$, and the electrodes 24 can be selectively actuated to produce a potential difference between an electrode 24 in linear array 23 and an opposite electrode 24 in array 25. When a voltage is applied to an electrode 24, a fringing field is generated across the width of the waveguide 22 as indicated by arrow 29 in FIG. 4. This electrical field induces a localized variation in the index of refraction of the waveguide material across the thickness, designated t in FIG. 4, of the waveguide 22. Voltages can be supplied to electrodes 24 in a known manner. For example, a multiplexer (not shown) can be used to sequentially apply a voltage to successive electrodes 24.

Light source 14, can be, for example, a laser coupled into the waveguide 22. A preferred laser for use in the present invention is a semiconductor laser. Because of the small thickness of the single-mode waveguide 22, direct end-fire coupling of external laser energy into the waveguide 22 is not very efficient. Reliable coupling of an input beam into the waveguide 22 can be maximized by fabricating the light source, such as a diode laser (not shown), directly on the waveguide. If the source is not fabricated on the waveguide, it may be desirable to couple the light source to the waveguide 22 by means of a prism or a grating in order to achieve greater efficiency.

The coupling of a beam 30 away from the line of the electrodes 24 can be achieved by an appropriately oriented Bragg-matched grating 26 (FIGS. 3 and 4). The light beam 30, produced by light source 14, propagates along optical axis 37 until it encounters a local change in the index of refraction in waveguide 22, induced by a voltage on an electrode 24. This change in the index of refraction changes the mode profile of the light beam 30, and the beam is radiated into the substrate 20 and toward grating 26. Grating lines 27 in grating 26 are oriented to yield a single output beam which is perpendicular to the electrodes 24. Imaging optics 16 can be, for example, of an afocal type which includes a pair of positive lens 17 and 19.

An important feature of the present invention is the high pixel density which can be obtained in scanner 10. The pixel spacing produced in scanner 10 is dependent on a number of factors, including the electro-optic strength of the material of waveguide 22 and the breakdown field in air above electrodes 24 ($\approx 3V/\mu m$). The minimum pixel spacing, $P_m$, in $\mu m$, in scanner 10 can be calculated, as follows:

$$P_m = \frac{8}{3}^{\frac{1}{2}} (n/k)^{\frac{1}{2}} Y_1^{\frac{1}{2}} (1+w_g) G^{\frac{1}{2}} \qquad (1)$$

where n is the refractive index of the waveguide material, $Y_a$ has a value in $\mu m$ on the order of the waveguide thickness, $w_g$ is the ratio of electrode width W to electrode gap G, and K is the electro-optic strength of the waveguide material in $\mu m/V$. Pixel spacing is also determined by the evanescent field tunneling through the index barrier.

A preferred material for waveguide 22 is BaTiO$_3$ which possesses an electro-optic tensor coefficient of $r_{15}$; this is 27 times as large as the coefficient for LiNbO$_3$ which is $r_{33}$. The very large electro-optic tensor coefficient of BaTiO$_3$ leads to an electro-optic strength which is potentially 33 times that for LiNbO$_3$.

In the operation of scanner 10 to impart information to receiving medium 18, a modulated beam from light source 14 enters waveguide 22 along axis 37. Electrodes 24 are actuated in sequence by means of voltages $V_1$-$V_n$ to induce a local change in the index of refraction of waveguide 22 at successive locations therein to scan the beam along a scan line 42 on receiving medium 18. In order to complete an image on medium 18, a means (not shown) is provided to move the receiving medium in a direction perpendicular to scan line 42 in timed relation to actuation of electrodes 24.

In the foregoing description, operation of the scanner 10 of the present invention has been described in an output mode. It will be apparent that scanner 10 could also be operated in an input mode. Thus, a light beam from a scanned surface (not shown) could be directed onto waveguide 22 of deflector 12, and the electrodes 24 could be sequentially actuated to deflect the light beam out of the waveguide 22 along axis 37. Upon emerging from the waveguide 22, the beam could be directed onto a photodetector (not shown). It also will be apparent that a scanner 10 operated in an output mode and a scanner 10 operated in an input mode could be used in combination for both the illumination of a receiving medium and the collection of light therefrom.

Figure 5:
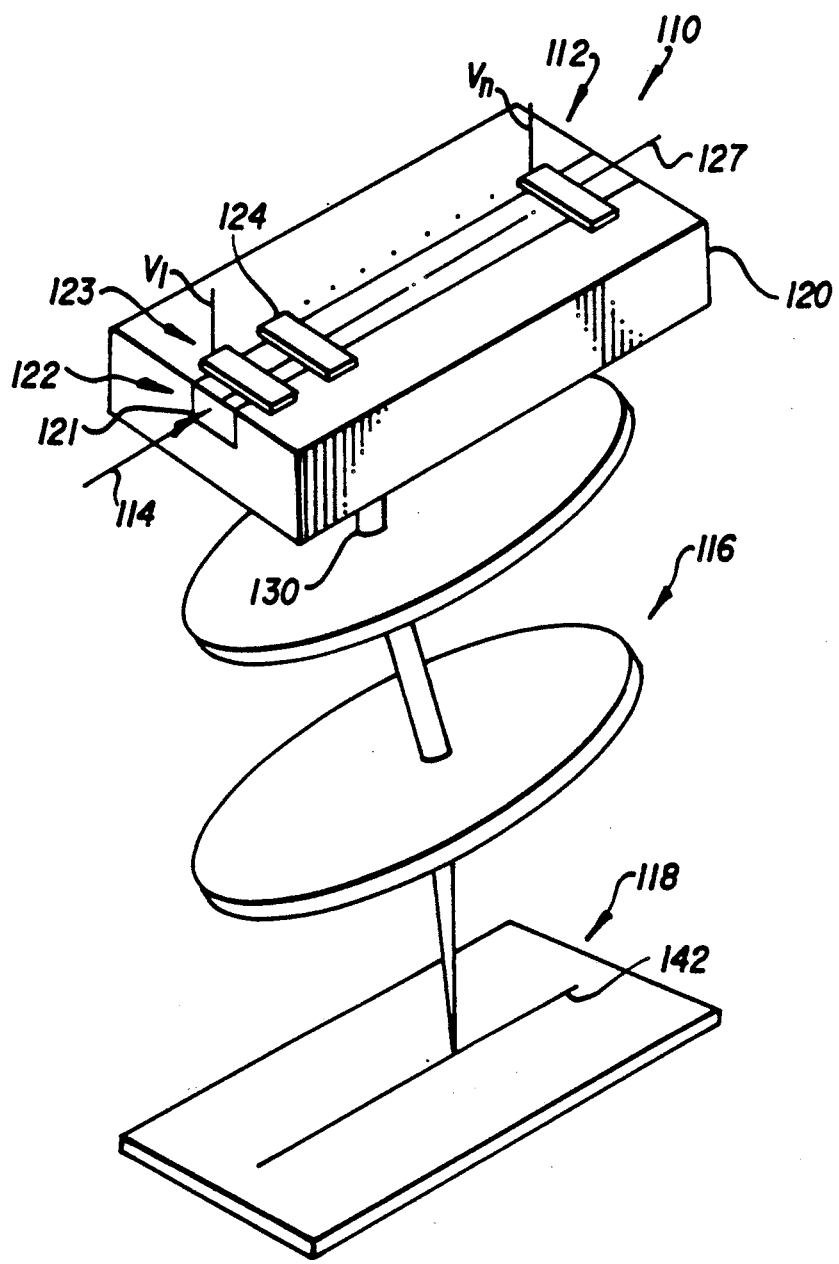
FIG. 5 is a perspective view of a second embodiment of the present invention.

In FIGS. 5-8, there is shown a second embodiment of the present invention. With reference to FIG. 5, scanner 110 includes a deflector 112 which comprises a substrate 120. Substrate 120 can be formed from an optical material such as glass, sapphire, or quartz. A thin film optical waveguide 122 is formed in a channel 121 on substrate 120. Waveguide 122 can be, for example, a semiconductor thin film grown on the substrate 120 by liquid phase, or vapor phase, epitaxy. Waveguide 122 can also be an electro-optic thin film material such as LiNbO$_3$, BaTiO$_3$, or an organic material of a high electro-optic coefficient. A preferred material for waveguide 122 is an organic material.

With reference to FIGS. 5 and 6, a linear array 123 of metallic electrodes 124 are formed over waveguide 122.

The electrodes 124 are parallel to each other and are spaced from each other by an equal amount. The electrodes 124 are disposed at a right angle to an optical axis 137. A transparent common electrode 131 (FIG. 8) is formed on substrate 120 from a material such as aluminum, prior to growing the waveguide 122. A voltage $V_1$-$V_n$ can be applied across successive electrodes 124 and common electrode 131 to form a direct field and induce a local change in the index of refraction of waveguide 122. A light source 114 is adapted to supply a light beam 130 to waveguide 122 along the optical axis 137.

The coupling of light beam 130 away from the line of the electrodes 124 can be achieved by an appropriately oriented Bragg-matched grating 126 (FIG. 7). The light beam 130 propagates along optical axis 137 until it encounters an electro-optically induced local change in the index of refraction in waveguide 122, produced by a voltage on an electrode 124. The change in the index of refraction changes the mode profile of the beam, and the beam is radiated into substrate 120 and toward grating 126. Grating lines 127 in grating 126 are oriented to yield a single output beam which is perpendicular to the electrodes 124. Imaging optics 116 are provided for for forming a scan line 142 on a receiving medium 118.

This invention has been described in detail with particular reference to a preferred embodiment thereof, but it will be understood that variations and modifications can be effected within the spirit and scope of the invention. For example, the wave guides 22 and 122 could be electro-optically formed, using the configuration of the electrodes shown in FIGS. 1 and 5. In the use of such a device, a voltage would normally be maintained on the electrodes 24 and 124, and a light beam would be scanned by sequentially discharging the electrodes 24 and 124.

I claim:

1. A scanner comprising:
   a substrate formed of an optical material;
   a thin film optical channel waveguide formed on said substrate;
   a first linear array of electrodes formed on one side of said waveguide and a second linear array of waveguides formed on an opposite side thereof, said electrodes extending in a first direction and the electrodes in each array being generally parallel to each other;
   means for regulating a voltage on said electrodes to electro-optically induce a local change in the refractive index of the waveguide across the thickness thereof;
   means for coupling a coherent light beam into said waveguide in a second direction transverse to said first direction, said beam propagating in said second direction and being radiated into the substrate under said waveguide upon encountering said refractive index change; and
   means for coupling the beam out of said waveguide.

2. A scanner, as defined in claim 1, wherein said second direction is perpendicular to said first direction.

3. A scanner, as defined in claim 1, wherein said means for coupling the beam out of said waveguide is a Bragg-matched grating formed in said substrate.

4. A scanner, as defined in claim 1, wherein optical elements are provided for imaging said beam onto a recording medium.

5. A scanner, as defined in claim 1, wherein said means for regulating the voltage includes means for changing a voltage on successive ones of said electrodes to move said beam across the recording medium.

6. A scanner, as defined in claim 5, wherein said voltage is applied across electrodes arranged on opposite sides of the waveguide.

7. A scanner, as defined in claim 1 wherein said waveguide is formed from $LiNbO_3$.

8. A scanner, as defined in claim 1 wherein said waveguide is formed from $BaTiO_3$.

9. A scanner for scanning a light beam across a receiving medium comprising:
   an optically-transmissive electro-optic element having a predetermined optical axis;
   a plurality of individually addressable electrodes coupled to said electro-optic element, said electrodes being equally spaced along said axis and being generally perpendicular thereto, and said electrodes being generally parallel to each other;
   means for applying a voltage to a selected one of said electrodes to induce a local variation in the index of refraction of said element across a thickness thereof;
   means for supplying a coherent beam of light to said element along said axis, said beam of light being radiated out of said element upon encountering said local variation in the index of refraction;
   means for coupling the deflected beam out of said element; and
   means for applying said voltage to successive ones of said electrodes to move said deflected beam across said receiving medium.

10. A scanner comprising:
    a substrate formed of an optical material;
    a thin film optical channel waveguide fabricated on said substrate;
    an array of metallic generally parallel electrodes formed adjacent to said waveguide, said electrodes extending in a first direction and being generally parallel to each other;
    means for applying a voltage to said electrodes to produce a local variation in the index of refraction across the width of the channel;
    means for directing a light beam from an object to be scanned onto said waveguide; and
    means for applying said voltage to successive ones of said electrodes to direct said light beam to a photosensitive element.

11. A scanner, as defined in claim 10, wherein said light beam is a laser beam.

12. A scanner comprising:
    a substrate formed of an optical material;
    a thin film optical channel waveguide formed on said substrate;
    a linear array of electrodes formed over said waveguide and a transparent common electrode located under said waveguide, said electrodes in the array extending in a first direction and being generally parallel to each other;
    means for changing a voltage between a selected one of said electrodes in said array and said common electrode to electro-optically induce a local change in the refractive index of the waveguide across the thickness thereof;
    means for coupling a coherent light beam into said waveguide in a second direction transverse to said first direction, said beam propagating in said second direction and being radiated into the substrate under said waveguide upon encountering said refractive index change; and
    means for coupling the beam out of said waveguide.

13. A scanner, as defined in claim 12, wherein said means for coupling the beam out of said waveguide is a grating located under said common electrode.

* * * * *